US010395841B2

(12) United States Patent
Lazarev et al.

(10) Patent No.: US 10,395,841 B2
(45) Date of Patent: Aug. 27, 2019

(54) MULTILAYERED ELECTRODE AND FILM ENERGY STORAGE DEVICE

(71) Applicant: Capacitor Sciences Incorporated, Menlo Park, CA (US)

(72) Inventors: Pavel Ivan Lazarev, Menlo Park, CA (US); Paul T. Furuta, Sunnyvale, CA (US); Barry K. Sharp, Redwood City, CA (US); Yan Li, Fremont, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 242 days.

(21) Appl. No.: 15/368,171

(22) Filed: Dec. 2, 2016

(65) Prior Publication Data

US 2018/0158616 A1    Jun. 7, 2018

(51) Int. Cl.
| C09D 5/24 | (2006.01) |
| H01B 1/12 | (2006.01) |
| H01G 4/01 | (2006.01) |
| H01G 4/14 | (2006.01) |
| H01G 4/32 | (2006.01) |
| H01G 4/33 | (2006.01) |
| C08G 73/02 | (2006.01) |
| C08G 73/06 | (2006.01) |
| H01G 4/008 | (2006.01) |
| C09D 165/00 | (2006.01) |

(52) U.S. Cl.
CPC .......... *H01G 4/32* (2013.01); *C09D 5/24* (2013.01); *C09D 165/00* (2013.01); *H01B 1/127* (2013.01); *H01B 1/128* (2013.01); *H01G 4/008* (2013.01); *H01G 4/01* (2013.01); *H01G 4/14* (2013.01); *C08G 73/0266* (2013.01); *C08G 73/0672* (2013.01); *C08G 2261/3142* (2013.01); *C08G 2261/3221* (2013.01); *C08G 2261/3223* (2013.01); *C08G 2261/3241* (2013.01); *C08G 2261/3422* (2013.01); *C08G 2261/51* (2013.01); *H01G 4/33* (2013.01)

(58) Field of Classification Search
CPC ...... H01G 4/005; H01G 4/008; H01G 4/0085; H01G 4/14; H01G 4/01; H01G 4/32; H01G 4/33
See application file for complete search history.

(56) References Cited

U.S. PATENT DOCUMENTS

| 3,407,394 A | 10/1968 | Hartke |
| 4,549,034 A | 10/1985 | Sato et al. |
| 4,694,377 A | 9/1987 | MacDougall et al. |
| 4,702,562 A | 10/1987 | Scheuble et al. |
| 4,894,186 A | 1/1990 | Gordon et al. |
| 5,187,639 A | 2/1993 | Ogawa et al. |
| 5,248,774 A | 9/1993 | Dietz et al. |
| 5,312,896 A | 5/1994 | Bhardwaj et al. |
| 5,384,521 A | 1/1995 | Coe |
| 5,395,556 A | 3/1995 | Drost et al. |
| 5,466,807 A | 11/1995 | Dietz et al. |
| 5,514,799 A | 5/1996 | Varanasi et al. |
| 5,581,437 A | 12/1996 | Sebillotte et al. |
| 5,583,359 A | 12/1996 | Ng et al. |
| 5,597,661 A | 1/1997 | Takeuchi et al. |
| 5,679,763 A | 10/1997 | Jen et al. |
| 5,742,471 A | 4/1998 | Barbee et al. |
| 5,840,906 A | 11/1998 | Zoltewicz et al. |
| 5,880,951 A | 3/1999 | Inaba |
| 6,282,081 B1 | 8/2001 | Takabayashi et al. |
| 6,294,593 B1 | 9/2001 | Jeng et al. |
| 6,341,056 B1 | 1/2002 | Allman et al. |
| 6,391,104 B1 | 5/2002 | Schulz |
| 6,426,861 B1 | 7/2002 | Munshi |
| 6,501,093 B1 | 12/2002 | Marks |
| 6,519,136 B1 | 2/2003 | Chu et al. |
| 6,617,830 B2 | 9/2003 | Nozu et al. |
| 6,798,642 B2 | 9/2004 | Decker et al. |
| 7,025,900 B2 | 4/2006 | Sidorenko et al. |
| 7,033,406 B2 | 4/2006 | Weir et al. |
| 7,211,824 B2 | 5/2007 | Lazarev |
| 7,342,755 B1 | 3/2008 | Horvat et al. |
| 7,460,352 B2 | 12/2008 | Jamison et al. |
| 7,466,536 B1 | 12/2008 | Weir et al. |
| 7,498,689 B2 | 3/2009 | Mitani et al. |
| 7,579,709 B2 | 8/2009 | Goetz et al. |
| 7,625,497 B2 | 12/2009 | Iverson et al. |
| 7,750,505 B2 | 7/2010 | Ichikawa |
| 7,808,771 B2 | 10/2010 | Nguyen et al. |

(Continued)

FOREIGN PATENT DOCUMENTS

| CA | 2074848 C | * 2/1998 | ............... H01G 4/06 |
| CN | 1582506 A | 2/2005 | |

(Continued)

OTHER PUBLICATIONS

Extended European Search Report dated Aug. 8, 2018 for European Patent Application No. 16756391.5.
Extended European Search Report dated Sep. 24, 2018 for European Patent Application No. 15856609.1.
Extended European Search Report dated Sep. 26, 2018 for European Patent Application No. 16797411.2.
Final Office Action for U.S. Appl. No. 15/043,247, dated Oct. 24, 2018.
Final Office Action for U.S. Appl. No. 15/043,315, dated Jun. 7, 2018.
Final Office Action for U.S. Appl. No. 15/449,587, dated Oct. 10, 2018.

(Continued)

*Primary Examiner* — Joseph R Kosack
(74) *Attorney, Agent, or Firm* — BCF LLP

(57) ABSTRACT

The present disclosure provides a multilayered electrode comprising an electro-conductive layer and at least one protective layer located on one side of the electro-conductive layer and selected from the list comprising a field-planarization layer, a tunneling injection blocking layer and a coulomb blocking layer.

37 Claims, 3 Drawing Sheets

(56) References Cited

U.S. PATENT DOCUMENTS

| | | |
|---|---|---|
| 7,837,902 B2 | 11/2010 | Hsu et al. |
| 7,893,265 B2 | 2/2011 | Facchetti et al. |
| 7,947,199 B2 | 5/2011 | Wessling |
| 7,990,679 B2 | 8/2011 | Ehrenberg et al. |
| 8,143,853 B2 | 3/2012 | Jestin et al. |
| 8,222,074 B2 | 7/2012 | Lazarev |
| 8,231,809 B2 | 7/2012 | Pschirer et al. |
| 8,236,998 B2 | 8/2012 | Nagata et al. |
| 8,344,142 B2 | 1/2013 | Marder et al. |
| 8,404,844 B2 | 3/2013 | Kastler et al. |
| 8,527,126 B2 | 9/2013 | Yamamoto et al. |
| 8,552,179 B2 | 10/2013 | Lazarev |
| 8,766,566 B2 | 7/2014 | Baba et al. |
| 8,818,601 B1 | 8/2014 | V et al. |
| 8,831,805 B2 | 9/2014 | Izumi et al. |
| 8,895,118 B2 | 11/2014 | Geivandov et al. |
| 8,929,054 B2 | 1/2015 | Felten et al. |
| 8,938,160 B2 | 1/2015 | Wang |
| 9,056,676 B1 | 6/2015 | Wang |
| 9,589,727 B2 | 3/2017 | Lazarev |
| 9,899,150 B2 | 2/2018 | Lazarev |
| 9,916,931 B2 | 3/2018 | Lazarev |
| 9,978,517 B2 | 5/2018 | Lazarev et al. |
| 2002/0027220 A1 | 3/2002 | Wang et al. |
| 2002/0048140 A1 | 4/2002 | Gallay et al. |
| 2003/0026063 A1 | 2/2003 | Munshi |
| 2003/0102502 A1 | 6/2003 | Togashi |
| 2003/0105365 A1 | 6/2003 | Smith et al. |
| 2003/0142461 A1 | 7/2003 | Decker et al. |
| 2003/0160595 A1 | 8/2003 | Provanzana et al. |
| 2003/0219647 A1 | 11/2003 | Wariishi |
| 2004/0173873 A1 | 9/2004 | Kumar et al. |
| 2004/0222413 A1 | 11/2004 | Hsu et al. |
| 2004/0223291 A1 | 11/2004 | Naito et al. |
| 2005/0118083 A1 | 6/2005 | Tabuchi |
| 2006/0120014 A1 | 6/2006 | Nakamura et al. |
| 2006/0120020 A1 | 6/2006 | Dowgiallo |
| 2007/0001258 A1 | 1/2007 | Aihara |
| 2007/0108940 A1 | 5/2007 | Sainomoto et al. |
| 2007/0159767 A1 | 7/2007 | Jamison et al. |
| 2007/0181973 A1 | 8/2007 | Hung et al. |
| 2008/0002329 A1 | 1/2008 | Pohm et al. |
| 2008/0150484 A1 | 6/2008 | Kimball et al. |
| 2008/0266750 A1 | 10/2008 | Wu et al. |
| 2008/0283283 A1 | 11/2008 | Abe et al. |
| 2009/0040685 A1 | 2/2009 | Hiemer et al. |
| 2009/0184355 A1 | 7/2009 | Brederlow et al. |
| 2010/0038629 A1 | 2/2010 | Lazarev |
| 2010/0085521 A1 | 4/2010 | Kasianova et al. |
| 2010/0172066 A1 | 7/2010 | Baer et al. |
| 2010/0178728 A1 | 7/2010 | Zheng et al. |
| 2010/0183919 A1 | 7/2010 | Holme et al. |
| 2010/0193777 A1 | 8/2010 | Takahashi et al. |
| 2010/0214719 A1 | 8/2010 | Kim et al. |
| 2010/0233491 A1 | 9/2010 | Nokel et al. |
| 2010/0255381 A1 | 10/2010 | Holme et al. |
| 2010/0269731 A1 | 10/2010 | Jespersen et al. |
| 2010/0309696 A1 | 12/2010 | Guillot et al. |
| 2010/0315043 A1 | 12/2010 | Chau |
| 2011/0006393 A1 | 1/2011 | Cui |
| 2011/0042649 A1 | 2/2011 | Duvall et al. |
| 2011/0079733 A1 | 4/2011 | Langhals et al. |
| 2011/0079773 A1 | 4/2011 | Wasielewski et al. |
| 2011/0110015 A1 | 5/2011 | Zhang et al. |
| 2011/0228442 A1 | 9/2011 | Zhang et al. |
| 2012/0008251 A1 | 1/2012 | Yu et al. |
| 2012/0033342 A1 | 2/2012 | Ito et al. |
| 2012/0053288 A1 | 3/2012 | Morishita et al. |
| 2012/0056600 A1 | 3/2012 | Nevin |
| 2012/0059307 A1 | 3/2012 | Harris et al. |
| 2012/0113380 A1 | 5/2012 | Geivandov et al. |
| 2012/0122274 A1 | 5/2012 | Lazarev |
| 2012/0244330 A1 | 9/2012 | Sun et al. |
| 2012/0268862 A1 | 10/2012 | Song et al. |
| 2012/0274145 A1 | 11/2012 | Taddeo |
| 2012/0302489 A1 | 11/2012 | Rodrigues et al. |
| 2013/0056720 A1 | 3/2013 | Kim et al. |
| 2013/0187475 A1 | 7/2013 | Vendik et al. |
| 2013/0194716 A1 | 8/2013 | Holme et al. |
| 2013/0215535 A1 | 8/2013 | Bellomo |
| 2013/0224473 A1 | 8/2013 | Tassell et al. |
| 2013/0314839 A1 | 11/2013 | Terashima et al. |
| 2013/0342967 A1 | 12/2013 | Lai et al. |
| 2014/0035100 A1 | 2/2014 | Cho |
| 2014/0036410 A1 | 2/2014 | Okamatsu et al. |
| 2014/0098458 A1 | 4/2014 | Almadhoun et al. |
| 2014/0158340 A1 | 6/2014 | Dixler et al. |
| 2014/0185260 A1 | 7/2014 | Chen et al. |
| 2014/0268490 A1 | 9/2014 | Tsai et al. |
| 2014/0316387 A1 | 10/2014 | Harris et al. |
| 2014/0347787 A1 | 11/2014 | Fathi et al. |
| 2015/0008671 A1 | 1/2015 | Rentero et al. |
| 2015/0008735 A1 | 1/2015 | Mizoguchi |
| 2015/0158392 A1 | 6/2015 | Zhao |
| 2015/0162131 A1 | 6/2015 | Felten et al. |
| 2015/0249401 A1 | 9/2015 | Eriksen et al. |
| 2016/0001662 A1 | 1/2016 | Miller et al. |
| 2016/0020026 A1 | 1/2016 | Lazarev |
| 2016/0020027 A1 | 1/2016 | Lazarev |
| 2016/0254092 A1 | 9/2016 | Lazarev et al. |
| 2016/0314901 A1 | 10/2016 | Lazarev |
| 2016/0340368 A1 | 11/2016 | Lazarev |
| 2016/0379757 A1 | 12/2016 | Robinson et al. |
| 2017/0117097 A1 | 4/2017 | Furuta et al. |
| 2017/0133167 A1 | 5/2017 | Keller et al. |
| 2017/0232853 A1 | 8/2017 | Lazarev et al. |
| 2017/0233528 A1 | 8/2017 | Sharp et al. |
| 2017/0236641 A1 | 8/2017 | Furuta et al. |
| 2017/0236642 A1 | 8/2017 | Furuta et al. |
| 2017/0236648 A1 | 8/2017 | Lazarev et al. |
| 2017/0237271 A1 | 8/2017 | Kelly-Morgan et al. |
| 2017/0237274 A1 | 8/2017 | Lazarev et al. |
| 2017/0287637 A1 | 10/2017 | Lazarev et al. |
| 2017/0287638 A1 | 10/2017 | Lazarev et al. |
| 2017/0301467 A1 | 10/2017 | Lazarev et al. |
| 2018/0033554 A1 | 2/2018 | Li et al. |
| 2018/0061582 A1 | 3/2018 | Furuta et al. |
| 2018/0122143 A1 | 5/2018 | Ellwood |
| 2018/0126857 A1 | 5/2018 | Kelly-Morgan |
| 2018/0137978 A1 | 5/2018 | Hein et al. |
| 2018/0137984 A1 | 5/2018 | Furuta et al. |
| 2018/0158616 A1 | 6/2018 | Lazarev et al. |

FOREIGN PATENT DOCUMENTS

| | | |
|---|---|---|
| CN | 1748271 B | 6/2010 |
| CN | 103261370 A | 8/2013 |
| CN | 203118781 U | 8/2013 |
| CN | 203377785 U | 1/2014 |
| CN | 103986224 A | 8/2014 |
| CN | 103258656 B | 8/2015 |
| DE | 10203918 A1 | 8/2003 |
| DE | 102010012949 A1 | 9/2011 |
| DE | 102011101304 A1 | 11/2012 |
| DE | 102012016438 A1 | 2/2014 |
| EP | 0493716 A1 | 7/1992 |
| EP | 0585999 A1 | 3/1994 |
| EP | 0602654 A1 | 6/1994 |
| EP | 0729056 A1 | 8/1996 |
| EP | 0791849 A1 | 8/1997 |
| EP | 0865142 B1 | 5/2008 |
| EP | 2062944 A1 | 5/2009 |
| EP | 2108673 A1 | 10/2009 |
| EP | 2415543 A1 | 2/2012 |
| EP | 1486590 B1 | 12/2013 |
| EP | 2759480 A1 | 7/2014 |
| EP | 1990682 B1 | 1/2015 |
| GB | 547853 A | 9/1942 |
| GB | 923148 A | 4/1963 |
| GB | 2084585 B | 11/1983 |
| JP | S6386731 A | 4/1988 |
| JP | H03253014 A | 11/1991 |
| JP | 2786298 B2 | 8/1998 |
| JP | 2001093778 A | 4/2001 |

(56) References Cited

FOREIGN PATENT DOCUMENTS

| JP | 2007287829 A | 11/2007 |
|---|---|---|
| JP | 2010106225 A | 5/2010 |
| JP | 2010160989 A | 7/2010 |
| JP | 2011029442 A | 2/2011 |
| JP | 2014139296 A | 7/2014 |
| RU | 2199450 C1 | 2/2003 |
| RU | 2512880 C2 | 4/2014 |
| WO | 1990009616 A1 | 8/1990 |
| WO | 0139305 A1 | 5/2001 |
| WO | 2002026774 A2 | 4/2002 |
| WO | 2007078916 A2 | 7/2007 |
| WO | 2008038047 A2 | 4/2008 |
| WO | 2009144205 A1 | 12/2009 |
| WO | 2009158553 A2 | 12/2009 |
| WO | 2011056903 A1 | 5/2011 |
| WO | 2011137137 A1 | 11/2011 |
| WO | 2012012672 A2 | 1/2012 |
| WO | 2012084536 A1 | 6/2012 |
| WO | 2012122312 A1 | 9/2012 |
| WO | 2012142460 A1 | 10/2012 |
| WO | 2012162500 A2 | 11/2012 |
| WO | 2013009772 A1 | 1/2013 |
| WO | 2013085467 A1 | 6/2013 |
| WO | 2014009686 A1 | 1/2014 |
| WO | 2015003725 A1 | 1/2015 |
| WO | 2015175522 A1 | 11/2015 |

OTHER PUBLICATIONS

M. Jurow et al, "Porphyrins as molectular electronic compounds of functional devices", Coordination Chemistry Reviews, Elsevier Science, Amsterdam NL, vol. 254, No. 19-20, Oct. 1, 2010, pp. 2297-2310.
Non-Final Office Action for U.S. Appl. No. 15/043,247, dated Jun. 7, 2018.
Non-Final Office Action for U.S. Appl. No. 15/430,339, dated Jul. 11, 2018.
Non-Final Office Action for U.S. Appl. No. 15/430,307, dated Jul. 16, 2018.
Non-Final Office Action for U.S. Appl. No. 15/449,587, dated May 21, 2018.
Non-Final Office Action for U.S. Appl. No. 15/710,587, dated Jul. 3, 2018.
Non-Final Office Action for U.S. Appl. No. 15/782,752, dated Sep. 21, 2018.
Non-Final Office Action for U.S. Appl. No. 15/801,240, dated Oct. 19, 2018.
Non-Final Office Action for U.S. Appl. No. 15/805,016, dated Jun. 4, 2018.
Non-Final/Final Office Action for U.S. Appl. No. 15/430,391, dated Jul. 20, 2018.
Notice of Allowance for U.S. Appl. No. 15/163,595, dated Jul. 30, 2018.
Office Action dated May 18, 2018 for Chinese Patent Application for Invention No. 201580025110.
Taiwanese Office Action for 886103 Application No. 106142206, dated Jul. 5, 2018.
Final Office Action for U.S. Appl. No. 15/710,587, dated Nov. 6, 2018.
Yue Wang, et. al., "Morphological and Dimensional Control via Hierarchical Assembly of Doped Oligoaniline Single crystals", J. Am. Chem. Soc. 2012, 134, pp. 9251-9262.
Deily, Dielectric and Optical Characterization of Polar Polymeric Materials: Chromophore Entrained PMMA Thin Films, Thesis, 2008.
Deruiter, J. Resonance and Induction Tutorial. Auburn University—Principles of Drug Action 1 Course Material. Spring 2005, 19 pages.
Final Office Action for U.S. Appl. No. 15/043,247, dated Oct. 4, 2017.
Handy, Scott T. "Ionic Liquids-Classes and Properties" Published Sep. 2011, Accessed Aug. 28, 2017, InTechweb.org.
Hsing-Yang Tsai et al, "1,6- and 1,7-Regioisomers of Asymmetric and Symmetric Perylene Bisimides: Synthesis, Characterization and Optical Properties" Molecules, 2014, vol. 19, pp. 327-341.
Hsing-Yang Tsai et al, "Synthesis and optical properties of novel asymmetric perylene bisimides", Journal of Luminescence, Vole 149, pp. 103-111 (2014).
International Search Report and Written Opinion for International Application No. PCT/US2016/019641, dated Jul. 12, 2016.
International Search Report and Written Opinion for International Application No. PCT/US2016/57765, dated Jan. 5, 2017.
International Search Report and Written Opinion for International Application No. PCT/US2017/016862, dated Aug. 14, 2017.
International Search Report and Written Opinion for International Application No. PCT/US2017/017150, dated May 18, 2017.
International Search Report and Written Opinion for International Application No. PCT/US2017/24150, dated Jun. 21, 2017.
International Search Report and Written Opinion for International Application No. PCT/US2017/24371, dated Aug. 2, 2017.
International Search Report and Written Opinion for International Application No. PCT/US2017/24600, dated Aug. 14, 2017.
Isoda, Kyosuke et al. "Truxene-Based Columnar Liquid Crystals: Self-Assembled Structures and Electro-Active Properties." Chemistry—An Asian Journal (2009), vol. 4, No. 10, pp. 1619-1625.
Johnson, Kieth E "What's an Ionic Liquid?" The Electrochemical Society Interface, Published Spring 2007, pp. 38-41, Accessed Aug. 28 2017.
Li, Li-Li et al. "Synthesis and Mesomorphism of Ether-ester Mixed Tail C3-symmetrical Truxene discotic liquid crystals." Liquid Crystals(2010), vol. 37, No. 5, pp. 499-506.
Liang, Mao et al. "Synthesis and Photovoltaic Performance of Two Triarylamine Organic Dyes Based on Truxene." Yinyong Huaxue (2011) vol. 28 No. 12, pp. 1387-1392.
Lu, Meng et al. "Organic Dyes Incorporating Bis-hexapropyltruxeneamino Moiety for efficient Dye-sensitized Solar Cells." Journal of Physical Chemistry C (2011) vol. 115, No. 1, pp. 274-281.
Maddalena, Francesco "Why are Ionic Liquids, Liquids?" http://www.quora.com/why-are-ionic-liquids-liquids?, Published Jan. 26, 2017, Accessed Aug. 28, 2017.
Manukian, BK. 216. IR.-spektroskopische Untersuchungen in der Imidazol-Reihe. Helvetica Chimica Acta. 1965, vol. 48, page.
Nagabrahmandachari et al. "Synthesis and Spectral Analysis of Tin Tetracarboxylates and Phosphinates" Indian Journal of Chemistry—Section A, 1995, vol. 34A, pp. 658-660.
Ni, Hai-Lang et al. "Truxene Discotic Liquid Crystals with Two Different Ring Substituents: Synthesis, Metamorphosis and High Charged Carrier Mobility ." Liquid Crystals, vol. 40, No. 3, pp. 411-420.
Non-Final Office Action dated Jun. 13, 2017 for U.S. Appl. No. 15/163,595.
Non-Final Office Action for U.S. Appl. No. 14/719,072, dated Aug. 2, 2017.
Non-Final Office Action for U.S. Appl. No. 15/043,247, dated Jun. 22, 2017.
Non-Final Office Action for U.S. Appl. No. 15/194,224, dated Sep. 27, 2017.
Non-Final Office Action for U.S. Appl. No. 14/710,480, dated May 8, 2017.
Non-Final Office Action for U.S. Appl. No. 15/043,186, dated Jun. 2, 2017.
Notice of Allowance for U.S. Appl. No. 14/710,480, dated Oct. 6, 2017.
Notice of Allowance for U.S. Appl. No. 14/752,600, dated Jul. 27, 2017.
Notice of Allowance for U.S. Appl. No. 14/919,337, dated Jul. 19, 2017.
Notice of Allowance for U.S. Appl. No. 14/931,757, dated Jul. 17, 2017.
Notice of Allowance for U.S. Appl. No. 14/931,757, dated Oct. 31, 2017.

(56) References Cited

OTHER PUBLICATIONS

Notice of Allowance for U.S. Appl. No. 15/053,943, dated Aug. 14, 2017.
Office Action dated Oct. 19, 2017 for Taiwan patent Application No. 106104501.
Trevethan, Thomas et al. "Organic Molecules Reconstruct Nanostructures on Ionic Surfaces." Small (2011), vol. 7, No. 9, pp. 1264-1270.
Warmerdam, T. W. et al. "Discotic Liquid Crystals. Physical Parameters of some 2, 3, 7, 8, 12, 13-hexa(alkanoyloxy) truxenes: Observation of a Reentrant Isotropic Phase in a Pure Disk-like mesogen." Liquid Crystals (1988), vol. 3, No. 8, pp. 1087-1104.
Co-pending U.S. Appl. No. 15/194,224, to Lazarev et al., filed Jun. 27, 2016.
Co-Pending U.S. Appl. No. 15/368,171, to Lazarev et al., filed Dec. 2, 2016.
Co-Pending U.S. Appl. No. 15/430,307, to Lazarev et al, filed Feb. 10, 2017.
Co-Pending U.S. Appl. No. 15/449,587, to Lazarev et al., filed Mar. 3, 2017.
Co-Pending U.S. Appl. No. 15/675,614, to Kelly-Morgan, filed Aug. 11, 2017.
Co-Pending U.S. Appl. No. 15/710,587, to Li et al, filed Sep. 20, 2017.
Co-Pending U.S. Appl. No. 15/469,126, to Lazarev et al, filed Mar. 24, 2017.
D C Tiwari, et al: "Temperature dependent studies of electric and dielectric properties of polythiophene based nano composite", Indian Journal of Pure & Applied Physicsvol. 50, Jan. 2012. pp. 49-56.
Extended European Search Report . 15792494.5, dated Dec. 11, 2017.
Extended European Search Report for Application No. 15792405.1, dated Nov. 10, 2017.
Non-Final Office Action for U.S. Appl. No. 15/090,509, dated Jun. 22, 2017.
Notice of Allowance for U.S. Appl. No. 14/710,480, dated Nov. 24, 2017.
Notice of Allowance for U.S. Appl. No. 14/719,072, dated Nov. 16, 2017.
Notice of Allowance for U.S. Appl. No. 14/752,600, dated Nov. 24, 2017.
Notice of Allowance for U.S. Appl. No. 14/752,600, dated Dec. 4, 2017.
Notice of Allowance for U.S. Appl. No. 14/919,337, dated Nov. 8, 2017.
Center for Dielectric Studies, Janosik, et al., "Ultra-High Energy Density Capacitors Through Improved Glass Technology", pp. 1-5 Center for Dielectric Studies Penn State University, dated 2004.
Chao-Hsien Ho et al., "High dielectric constant polyaniline/poly(acrylic acid) composites prepared by in situ polymerization", Synthetic Metals, vol. 158, pp. 630-637 (2008).
Congressional Research Service, Paul W. Parfomak, "Energy Storage for Power Grids and Electric Transportation: A Technology Assessment", pp. 87-94; Members and Committees of Congress; Mar. 27, 2012.
Department of Chemistry and Biochemistry, Hardy, et al. "Converting an Electrical Insulator into a Dielectric Capacitor: End-Capping Polystyrene with Oligoaniline"; pp. 799-807, Rensselaer Polytechnic Institute, Troy, New York 12180; Feb. 17, 2013.
Department of Chemistry, Ho et al., "High dielectric constant polyanilinelpoly(acrylic acid) composites prepared by in situ polymerization", pp. 630-637; National Taiwan University, Taipei, Taiwan, ROC, Apr. 15, 2008.
Final Office Action for U.S. Appl. No. 14/919,337, dated May 1, 2017.
Henna Ruuska et al., "A Density Functional Study on Dielectric Properties of Acrylic Acid Crafted Polypropylene", The Journal of Chemical Physics, vol. 134, p. 134904 (2011).
Hindawi Publishing Corporation, Chávez-Castillo et al, "Third-Order Nonlinear Optical Behavior of Novel Polythiophene Derivatives Functionalized with Disperse Red 19 Chromophore", pp. 1-11, International Journal of Polymer Science vol. 2015, Article ID 219361, Mar. 12, 2015.
Hindawi Publishing Corporation, González-Espasandín et al., "Fuel Cells: A Real Option for Unmanned Aerial Vehicles Propulsion", pp. 1-13, Torrej on de Ardoz, 28850 Madrid, Spain Jan. 30, 2014.
Hindawi Publishing Corporation, Khalil Ahmed et al., "High dielectric constant polyaniline/poly(acrylic acid) composites prepared by in situ polymerization", pp. 630-637, University of the Punjab, New Campus, Lahore 54590, Oct. 17, 2015.
Institute of Transportation Studies, Burke, et al. "Review of the Present and Future Applications of Supercapacitors in Electric and Hybrid Vehicles", pp. 2-23 UC Davis ITS; Dec. 2014.
International Search Report and Written Opinion for International Application No. PCT/US2015/030356, dated Jul. 28, 2015.
International Search Report and Written Opinion for International Application No. PCT/US2015/030415 dated Nov. 4, 2015.
International Search Report and Written Opinion for International Application No. PCT/US2015/058890, dated Feb. 25, 2016.
International Search Report and Written Opinion for International Application No. PCT/US2016/033628, dated Sep. 1, 2016.
International Search Report and Written Opinion for International Application No. PCT/US2016/039395, dated Oct. 20, 2016.
International Search Report and Written Opinion for International Application No. PCT/US2016/039395, dated Jul. 1, 2016.
International Search Report and Written Opinion for International Application No. PCT/US2017/017146, dated May 11, 2017.
International Union of Pure and Applied Chemistry Polymer Divison Stejskal et al., "Polyaniline: Thin Films and Colloidal Dispersions (IUPAC Technical Report)", vol. 77, No. 5, pp. 815-826, Russian Academy of Sciences, St. Petersburg 199004, Russia; 2005.
JACS Articles, Kang et. al., "Ultralarge Hyperpolarizability Twisted π-Electron System Electro-Optic Chromophores: Synthesis, Solid-State and Solution-Phase Structural Characteristics, Electronic Structures, Linear and Nonlinear Optical Properties, and Computational Studies", pp. 3267-3286; Perugia, Italy Feb. 20, 2007.
Jaroslav Stejskal and Irina Sapurina, "Polyaniline: Thin Films and Colloidal Dispersions (IUPAC Technical Report)", Pure and Applied Chemistry, vol. 77, No. 5, pp. 815-826 (2005).
Kontrakt Technology Limited, Alla Sakharova, PhD., "Cryscade Solar Limited: Intellectual Property Portfolio summary", pp. 1-3, Cryscade Solar Limited; Apr. 9, 2015.
Microelectronics Research and Communications Institute, Founders et al., "High-Voltage Switching Circuit for Nanometer Scale CMOS Technologies", pp. 1-4, University of Idaho, Moscow, ID 83843 USA, Apr. 30, 2007.
Molecular Diversity Preservation International, Barber, et al. "Polymer Composite and Nanocomposite Dielectric Materials for Pulse Power Energy Storage" pp. 1-32; 29 University of South Carolina, Columbia, SC 29208 Oct. 2009.
Non-Final Office Action for U.S. Appl. No. 15/053,943, dated Apr. 19, 2017.
Non-Final Office Action for U.S. Appl. No. 14/752,600, dated Jan. 23, 2017.
Non-Final Office Action for U.S. Appl. No. 14/919,337, dated Jan. 4, 2017.
Notice of Allowance for U.S. Appl. No. 14/710,491, dated Oct. 24, 2016.
Optical Society of America, Kuzyk et al, "Theory of Molecular Nonlinear Optics", pp. 5, 4-82, Department of Physics and Astronomy, Washington State University, Pullman, Washington 99164-2814, USA, Mar. 26, 2013.
Philosophical Transactions of the Royal Society, SIMON, "Charge storage mechanism in nanoporous carbons and its consequence for electrical double layer capacitors" pp. 3457-3467; Drexel University, Philadelphia, PA 19104, 2010.
R. J. Baker and B. P. Johnson, "stacking power MOSFETs for use in high speed instrumentation", Department of Electrical Engineering, University of Nevada, Reno, Reno. Nevada 89557-0030; pp. 5799-5801 Aug. 3, 1992.
Roger D. Hartman and Herbert A. Pohl, "Hyper-electronic Polarization in Macromolecular Solids", Journal of Polymer Science: Part A-1, vol. 6, pp. 1135-1152 (1968).

(56) References Cited

OTHER PUBLICATIONS

RSC Publishing, Akl et al., "Molecular materials for switchable nonlinear optics in the solid state, based on ruthenium-nitrosyl complexes", pp. 3518-3527, Porto Alegre, Brazil; May 24, 2013.
U.S. Appl. No. 15/043,186, to Paul T. Furuta, et al., filed Feb. 12, 2016.
U.S. Appl. No. 15/043,209, to Paul T. Furuta, et al., filed Feb. 12, 2016.
U.S. Appl. No. 15/043,247, to Barry K Sharp, et al., filed Feb. 12, 2016.
U.S. Appl. No. 15/043,315, to Ivan S.G. Kelley-Morgan, filed Feb. 12, 2016.
U.S. Appl. No. 15/090,509, to Pavel Ivan Lazarev, et al., filed Mar. 4, 2016.
U.S. Appl. No. 62/121,328, to Pavel Ivan Lazarev et al., filed Feb. 26, 2015.
U.S. Appl. No. 62/294,949, to Pavel Ivan Lazarev, et al., filed Feb. 12, 2016.
U.S. Appl. No. 62/294,955, to Pavel Ivan Lazarev, et al., filed Feb. 12, 2016.
U.S. Appl. No. 62/294,964, to Pavel Ivan Lazarev, et al., filed Feb. 12, 2016.
U.S. Appl. No. 62/318,134, to Pavel Ivan Lazarev, et al., filed Mar. 4, 2016.
Non-Final Office Action for U.S. Appl. No. 15/043,315, dated Dec. 26, 2017.
Notice of Allowance for U.S. Appl. No. 14/931,757, dated Dec. 29, 2017.
Office Action dated Dec. 13, 2017 for Taiwan Patent Application No. 106104499.
Office Action dated Dec. 13, 2017 for Taiwan Patent Application No. 106104500.

\* cited by examiner

MULTILAYERED ELECTRODE AND FILM ENERGY STORAGE DEVICE

FIELD OF THE INVENTION

The present invention relates generally to passive components of electrical circuit and more particularly to a multilayered electrode and a film energy storage device using thereof.

BACKGROUND

Electrodes (contacts) problems and methods of production of electrodes for electronic devices are widely discussed in scientific and technical literature.

The development of nanoscale MOSFETs has given rise to increased attention paid to the role of parasitic source/drain and contact resistance as a performance-limiting factor (see, Reinaldo Vega and, Tsu-Jae King Liu, "Advanced Source/Drain and Contact Design for Nanoscale CMOS", Electrical Engineering and Computer Sciences University of California at Berkeley, Technical Report No. UCB/EECS-2010-84 http://www.eecs.berkeley.edu/Pubs/TechRpts/2010/EECS-2010-84.html, May 20, 2010). Dopant-segregated Schottky (DSS) source/drain MOSFETs have become popular in recent years to address this series resistance issue, since DSS source/drain regions comprise primarily of metal or metal silicide. The small source/drain extension (SDE) regions extending from the metallic contact regions are an important design parameter in DSS MOSFETs, since their size and concentration affect contact resistance, series resistance, band-to-band tunneling (BTBT), SDE tunneling, and direct source-to-drain tunneling (DSDT) leakage. Reinaldo Vega and, Tsu-Jae King Liu's work investigates key design issues surrounding DSS MOSFETs from both a modeling and experimental perspective, including the effect of SDE design on ambipolar leakage, the effect of random dopant fluctuation (RDF) on specific contact resistivity, 3D FinFET source/drain and contact design optimization, and experimental methods to achieve tuning of the SDE region.

C. Liu, V. Kamaev, and Z. V. Vardeny in "Efficiency enhancement of an organic light-emitting diode with a cathode forming two-dimensional periodic hole array", APPLIED PHYSICS LETTERS, Vol. 86, p. 143501, (2005) describe fabrication of an organic light-emitting diode using a 7E -conjugated polymer emissive layer sandwiched between two semitransparent electrodes: an optically thin gold film anode, whereas the cathode was in the form of an optically thick aluminum (Al) film with patterned periodic subwavelength two-dimensional hole array that showed anomalous transmission in the spectral range of the polymer photoluminescence band. At similar current densities, we obtained a sevenfold electroluminescence efficiency enhancement with the patterned Al device compared with a control device based on un-perforated Al electrode.

In the article "Deposition of an Al Cathode for an OLED by Using Low-Damage Sputtering Method" (Sang-Mo Kim, Kyung-Hwan Kim, and Min-Jong Keum, Journal of the Korean Physical Society, Vol. 51, No. 3, pp. 1023-1026, September 2007), Al thin films for OLED devices were deposited on glass substrates and on a cell (LiF/EML/HTL/bottom electrode, ITO thin film) for various working gas such as Ar, Kr and mixed gases, and various working gas pressures. The film thickness and the crystallographic and electrical properties of the Al thin film were measured by an a-step profiler (TENCOR), an X-ray diffracto-meter (XRD, RIGAKU), a four-point probe (CHANGMIN) and an atomic force microscope (AFM), and the I-V curve of the Al/cell was measured by using a semiconductor parameter measurement (HP4156A). The crystallinity and resistivity of Al thin films prepared on glass indicated that the films were amorphous with resistivities under $10^{-5}$ Ω-cm. In the case of the Al thin films deposited on cell using pure Ar or Kr, the leakage-current density of the Al/cell was about $10^{-4}$ mA/cm$^2$, and the leakage-current density of the Al/cell prepared by using Ar and Kr mixed gas was about $10^{-6}$ mA/cm$^2$.

The performance of organic light emitting device (OLED) structures, based on identically fabricated Alq 3/TPD active regions, with various anode and cathode electrode structures were compared by H. Mu et al. in "A comparative study of electrode effects on the electrical and luminescent characteristics of Alq 3/TPD OLED: Improvements due to conductive polymer (PEDOT) anode" (Journal of Luminescence, Vol. 126, pp. 225-229, (2007)), and performance differences related to the different anode structure . The best performance was achieved with a conductive polymer, 3,4-polyethylenedioxythiopene-polystyrenesultonate (PEDOT), used as an anode layer, yielding a brightness of 1720 cd/m$^2$ at 25V, a turn-on voltage of 3V, and electroluminescence (EL) efficiency and external quantum efficiency of 8.2 cd/A and 2%, respectively, at a brightness of 100 cd/m$^2$ and 5V.

In the article "Origin of damages in OLED from Al top electrode deposition by DC magnetron sputtering" (Organic Electronics, Vol. 11, pp. 322-331, (2010)), Tae Hyun Gil et al. examine organic light emitting diodes (OLEDs) having Al top electrodes deposited on organic layers by direct-current magnetron sputtering. The OLEDs consisted of electronically doped transport layers and phosphorescent emission layer were characterized by typical current—voltage—luminance measurement. They showed higher leakage currents, decreased forward currents, and corresponding increases of driving voltage after the sputter deposition on the organic layers. The OLEDs exhibited randomly distributed bright spots on the active area, and the bright spots were investigated by scanning electron microscopy/energy-dispersive X-ray spectroscopy. In order to prove the origins of sputter damage, simple organic/Al layer samples were made and investigated by ellipsometry and laser-induced desorption/ionization time-of-flight mass spectrometry.

Glyn J. Reynolds et al. fabricated simple thin-film capacitor stacks from sputter-deposited doped barium titanate dielectric films with sputtered Pt and/or Ni electrodes and electrically characterized ("Electrical Properties of Thin-Film Capacitors Fabricated Using High Temperature Sputtered Modified Barium Titanate", Materials, Vol. 5, pp. 644-660, (2012)). Here, Glyn J. Reynolds et al. reported small signal, low frequency capacitance and parallel resistance data measured as a function of applied DC bias, polarization versus applied electric field strength and DC load/unload experiments. These capacitors exhibited significant leakage (in the range 8-210 µA/cm$^2$) and dielectric loss. Measured breakdown strength for the sputtered doped barium titanate films was in the range 200 kV/cm$^{-2}$ MV/cm. For all devices tested, Glyn J. Reynolds et al. observed clear evidence for dielectric saturation at applied electric field strengths above 100 kV/cm: saturated polarization was in the range 8-15 µC/cm$^2$. When cycled under DC conditions, the maximum energy density measured for any of the capacitors tested by Glyn J. Reynolds et al. was ~4.7×$10^{-2}$W-h/liter based solely on the volume of the dielectric material. This corresponds to a specific energy of ~8×$10^{-3}$ W-h/kg, again calculated on a dielectric-only basis. These results are compared to those reported by other authors and a simple theoretical treatment provided that quantifies the maximum energy that can be stored in these and similar devices as a function of dielectric strength and saturation polarization. Finally, Glyn J. Reynolds et al. developed a predictive model to provide guidance on how to tailor the relative permittivities of high-k dielectrics in order to optimize their energy storage capacities.

According to Donna M. Joyce et al., Electrostatic capacitors offer higher power density, lower loss, and higher operating voltage than their electrolytic and super-capacitor counterparts ("Re-engineering the Polymer Capacitor, Layer by Layer", Adv. Energy Mater., 1600676, (2016)). However, these capacitors suffer from the low energy density (<2 J cm −3), limiting their applications in high power integrated systems such as pulsed power and high frequency inverters. Donna M. Joyce et al. propose a novel approach to achieve higher energy densities by re-engineering the architecture of capacitors. The new capacitor device is a layered structure that incorporates thin electron and hole blocking layers deposited between the conducting electrodes and the dielectric material.

The quality of electrodes plays an extremely important role in all listed electronic devices. An important characteristic of electrodes is an ability to prevent considerable leakage currents. In particular, this property (quality) of electrodes is important for energy storage devices. In the electric-power industry super-capacitors are often used as energy storage devices. An increase in voltage on the electrodes of a capacitor (e.g., a super-capacitor) leads to increasing of the storage energy. The maximum value of working voltage is limited to a breakdown voltage of the capacitor. In turn, the breakdown voltage is affected by the quality of dielectric and, in particular, the degree to which the electrodes do not inject electrons or holes from electrodes and consequently do not provoke a breakdown of the dielectric of the capacitor.

SUMMARY

The present disclosure is intended to overcome the drawbacks of the prior art super-capacitor electrodes by reducing the tendency of the electrodes to inject electrons in a dielectric layer of the capacitor (and to thereby decrease leakage currents).

The present disclosure provides a multilayered electrode comprising an electro-conductive layer and at least one protective layer located on one side of the electro-conductive layer. The at least one protective layer may include a field-planarization layer, a tunneling injection blocking layer or a coulomb blocking layer or some combination of two or more of these. A field-planarization layer minimizes electric field enhancement due to geometric curvature on the surface of the electro-conductive layer. A tunneling injection blocking layer comprises a wide-band gap organic insulating material. A coulomb blocking layer comprises electron traps.

In another aspect, the present disclosure provides a multilayered structure for an energy storage device comprising a dielectric layer, and the multilayered electrode disclosed above and located on at least one surface of the dielectric layer.

In still another aspect, the present disclosure provides a film energy storage device comprising two multilayered structures disclosed above and laminated with each other. The laminated structure may be characterized by the following sequence of layers: multilayered electrode—dielectric layer—multilayered electrode—dielectric layer.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWING

A more complete assessment of the present invention and its advantages will be readily achieved as the same becomes better understood by reference to the following detailed description, considered in connection with the accompanying drawings and detailed specification, all of which forms a part of the disclosure. Embodiments of the invention are illustrated, by way of example only, in the following Figures, of which.

DETAILED DESCRIPTION

Figure 1:
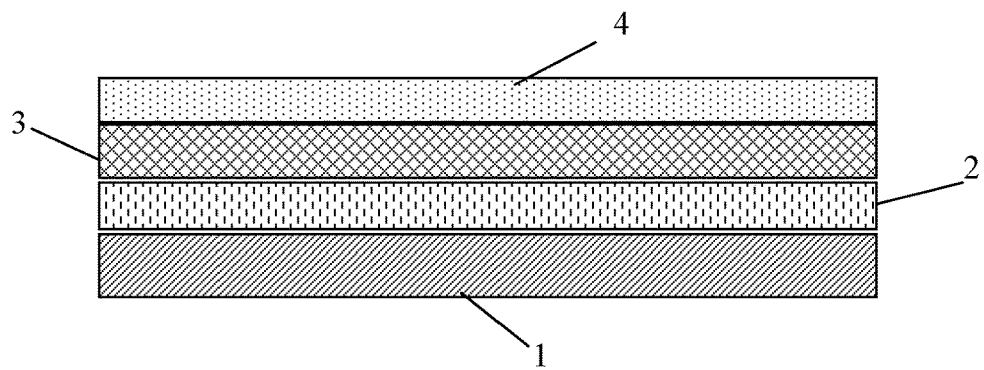
FIG. 1 schematically shows one non-limiting example of a multilayered electrode in accordance with aspects of the present disclosure.

While various embodiments illustrating aspects of the present disclosure have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

In the present disclosure the following terminology is used.

The term "an electro-conductive layer" refers to a layer of an electro-conductive material which is formed, for example, by a vacuum evaporation (deposition) of atoms of metals or electro-conductive organic molecules onto a surface of any substrate. The external surface of this layer may be rough. The roughness of the surface may be envisioned as a set of ledges and cavities which form a surface microprofile. If such electro-conductive layers are used, for example, in capacitors, near these ledges areas of high electric field are formed. This high electric field can lead to breakdown of a dielectric layer of the capacitor. Therefore, to prevent such destructive processes it is necessary to use field-planarization layers. Nevertheless, the roughness (ledges) of the electro-conductive layers formed by deposition of metals are higher in comparison with the roughness (ledges) of the electro-conductive layers formed by deposition of organic molecules. Therefore, it is more necessary to use the field-planarization layers in case of the metal electro-conductive layers.

The term "a field-planarization layer" refers to a layer which smooths out a discontinuity of an electric field on a surface of the electro-conductive layer. The field-planarization layer may be made of polarizable or electro-conductive materials deposited from a liquid or melt stage (phase). When using metal for formation of the field-planarization layer, metal fills up cavities on a surface of the electro-conductive layer and by that reduces its roughness. When polarizable materials are used for formation of the field-planarization layer, then these materials reduce intensity of an electric field in area near of the ledges on the surface of the electro-conductive layer due to the material's polarizability.

The term "LUMO" means a lowest unoccupied molecular orbital.

The term "HOMO" means a highest occupied molecular orbital.

The term "a tunneling injection blocking layer" refers to a layer having the difference in the energy levels of its LUMO and HOMO levels that is greater than 4 electron-volts. In one embodiment such layer provides increase of an energy gap $E_{ge}$ for electrons which is equal to difference between LUMO-level of the tunneling injection blocking layer and work function Wf of the electro-conductive layer. The value of the energy gap $E_{ge}$ may be not less than 1 electron-volt. This energy gap prevents injection of electrons from the electro-conductive layer. In another embodiment such a layer provides increase of an energy gap $E_{gh}$ for holes which is equal to difference between a work function Wf of the electro-conductive layer and HOMO-level of the tunneling injection blocking layer. The value of the energy gap $E_{gh}$ may be not less than 1 electron-volt. This energy gap prevents injection of holes from the electro-conductive layer.

The term "a coulomb blocking layer" refers to a layer containing electronic traps. When electrons are injected into this layer, they become motionless (are fixed) in these traps and the layer becomes negatively charged at the expense of the electrons which are stored in this layer. This stored electric charge can prevent injection of new electrons into this layer due to Coulomb repulsion of the injected electrons and the stored electric charge. Thus, "the coulomb blocking layer" carries out blockade of an injection of electrons into this coulomb blocking layer.

The term "a wide-band gap organic insulating material" refers to a material having an energy gap band, i.e., the difference between the LUMO and HOMO energy levels, greater than 4 electron-volts.

The term "breakdown field strength" refers to a characteristic electric field in which the dielectric layer becomes conductive.

The present disclosure provides the multilayered electrode as disclosed above. In one embodiment of the present disclosure, the multilayered electrode comprises one, two or three protective layers which are different and selected from the list consisting of the field-planarization layer, tunneling injection blocking layer and the coulomb blocking layer, wherein the listed layers may be in any sequence.

In another embodiment of disclosed multilayered electrode, a material of the electro-conductive layer may be selected from the list consisting of metal, an electro-conductive oligomer, an electro-conductive (current-conducting) polymer, a molecular-crystal material, a molecular material.

In yet another embodiment of the multilayered electrode, the electro-conductive (current-conducting) polymer may be selected from the list consisting of polyacetylene, polypyrrole, polythiophene, polyaniline, poly-p-phenylenesulphide, poly-para-phenylenevinylene, polyindole, polycarbazole, polyazulene, polyfluorene, polynaphthalene.

In still another embodiment of the multilayered electrode, the material of the electro-conductive layer may be selected from the list consisting nickel, gold, platinum, lead, chromium, titanium, copper, aluminum, molybdenum, tungsten, indium, silver, calcium, tantalum, palladium and any combination thereof.

In one embodiment of the multilayered electrode, the material of the electro-conductive layer comprises an electro-conductive oligomer, such as a phenylene oligomer or a polyacene quinine radical oligomer. In some such embodiments of the multilayered electrode, the electro-conductive oligomer may be selected from structures 1 to 9 as shown in Table 1, wherein n=2, 3, 4, 5, 6, 7, 8, 9, 10, 11 or 12, Z is =O, =S or =NT$_1$, and T$_1$ is selected from the group consisting of unsubstituted or substituted C$_1$-C$_{18}$alkyl, unsubstituted or substituted C$_2$-C$_{18}$alkenyl, unsubstituted or substituted C$_2$-C$_{18}$alkynyl, and unsubstituted or substituted C$_4$-C$_{18}$aryl.

TABLE 1

Examples of the electro-conductive oligomers

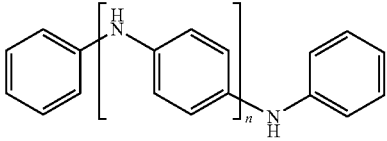

1

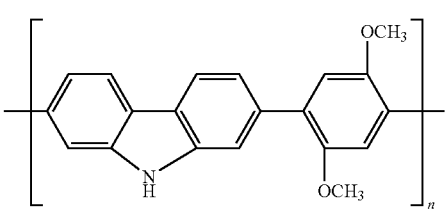

2

TABLE 1-continued

Examples of the electro-conductive oligomers

[structures 3–14 shown, including thiophene, carbazole, benzothiadiazole-carbazole, thienylenevinylene, methoxythiophene, anthracene-Z, pentacene-Z oligomers, and rylene-based diimide/benzimidazole oligomers]

Where n=0, 1, 2, 3, 4, 5, 6, 7, 8 and represents the number of repeat units.

In yet another embodiment, the field-planarization layer may be made of a polarizable material deposited from liquid or melt stage (phase), where polarizability of the polarizable material is greater than polarizability of propylene. The polarizable material may include organic compounds comprised of rylene moieties optionally conjugated or unconjugated with phenyl, naphthyl, or anthryl moieties, and dopant groups of nucleophilic and electrophilic types optionally positioned in apex and lateral positions of the organic compound. Positioning of the dopant groups can be selected to increase or decrease non-linear polarization response to an electric field. Such positioning can be related to symmetry of the organic compound. Non limiting examples of the organic compounds comprised of rylene moieties include:

In still another embodiment, the field-planarization layer may be made of an electro-conductive material deposited from liquid or melt stage (phase). In one embodiment of the multilayered electrode, the field-planarization layer may be created by spin coating of mentioned above materials onto the electro-conductive layer. In one embodiment of the multilayered electrode, the material of the coulomb blocking layer comprises tetrapyrrolic macrocyclic fragments having a general structural formula from the group comprising structures 10-14 as shown in Table 1, where M is an atom of metal serving as electron traps.

TABLE 2

Examples of the organic compounds comprising tetrapirolic macro-cyclic fragments

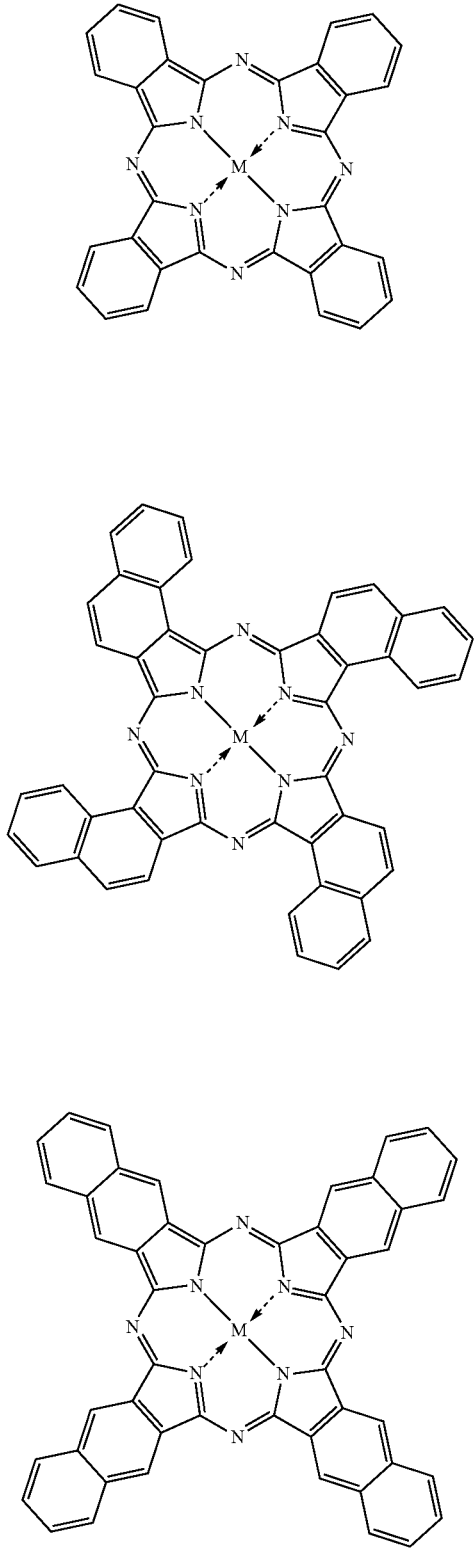
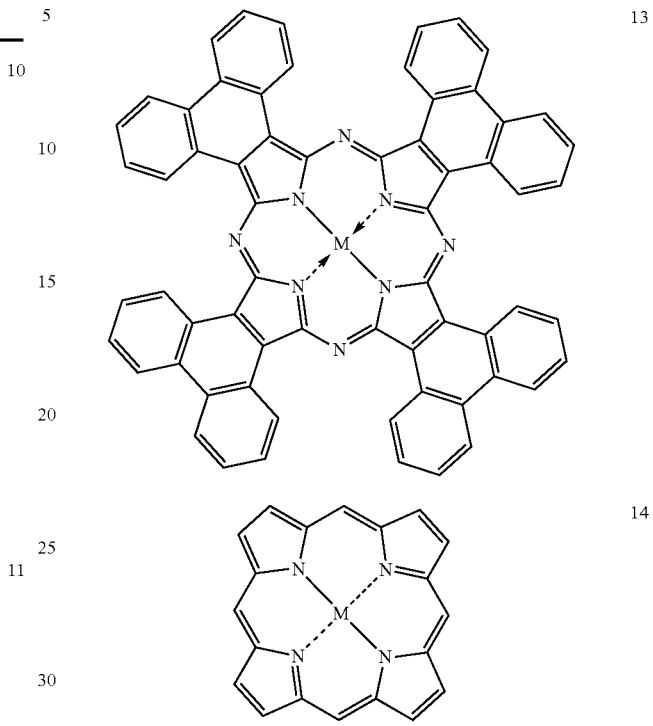

In one embodiment of the disclosed multilayered electrode, the wide-band gap organic insulating material may have an energy gap between the LUMO and HOMO energy levels greater than 4 electron-volts. In another embodiment of the disclosed multilayered electrode, the difference between LUMO-level of the wide-band gap organic insulating material and a work function (Wf) of the electro-conductive layer is not less than 1 electron-volt. In yet another embodiment of the disclosed multilayered electrode, the difference between a work function (Wf) of the electro-conductive layer and HOMO-level of the wide-band gap organic insulating material is not less than 1 electron-volt. In one embodiment of the disclosed multilayered electrode, the tunneling injection blocking layer is monomolecular layer and comprises amphiphilic molecules selected from the list consisting of amines ($RNH_3^+$), carboxylates ($RCO_2^-$), sulphates ($RSO_4^-$), sulfonates ($RSO_3^-$), phosphates ($RHPO_4^-$), alcohols (ROH), thiols (RSH), where R is a carbon chain comprising more than ten $CH_2$- and $CF_2$-groups. In one embodiment of the disclosed multilayered electrode, the carbon chains are polymerized by ultraviolet light. In another embodiment of the disclosed multilayered electrode, a thickness of the tunneling injection blocking layer is not less, than lnm and is defined by the carbon chain length.

Aspects of the present disclosure include the multilayered structure as disclosed above. Additional aspects of the present disclosure include a multilayered structure configured for use as an energy storage device. Such a multilayered structure comprises a dielectric layer, and the multilayered electrode located on one surface of the dielectric layer. The electro-conductive layer of the multilayered electrode may be produced from the electro-conductive organic compound by the Cascade Crystallization process.

Cascade Crystallization involves a chemical modification step and four steps of ordering during the electro-conductive layer formation. The chemical modification step introduces hydrophilic groups on the periphery of the molecule of the electro-conductive organic compound in order to impart amphiphilic properties to the molecule. Amphiphilic molecules stack together into supra-molecules, which is the first step of ordering. At certain concentration, supra-molecules are converted into a liquid-crystalline state to form a lyotropic liquid crystal, which is the second step of ordering. The lyotropic liquid crystal is deposited under the action of a shear force (or meniscus force) onto the dielectric layer based on a Mayer Rod shearing technique, so that shear force (or the meniscus) direction determines the crystal axis direction in the resulting the electro-conductive layer. This directional deposition is third step of ordering, representing the global ordering of the crystalline or polycrystalline structure on the dielectric layer surface. The last fourth step of the Cascade Crystallization process is drying/crystallization, which converts the lyotropic liquid crystal into a solid crystal electro-conductive layer. The term Cascade Crystallization process is used to refer to the chemical modification and four ordering steps as a combination process.

The Cascade Crystallization process is used for production of thin crystalline electro-conductive layers. The electro-conductive layer produced by the Cascade Crystallization process has a global order which means that a direction of the crystallographic axis of the layer over the entire dielectric layer surface is controlled by the deposition process. Molecules of the deposited electro-conductive organic compound are packed into supra-molecules with a limited freedom of diffusion or motion. The thin crystalline electro-conductive layer is molecular-crystal layer characterized by an inter-planar spacing of 3.4±0.3 Angstroms (Å) in the direction of one of the optical axes. In other embodiment of disclosed multilayered structure, the electro-conductive layer may be formed by vacuum deposition of metal atoms onto the dielectric layer. In one embodiment of the disclosed multilayered structure, the dielectric layer comprises a material having breakdown field strength greater than 0.5 V/nm, greater than 1.0 V/nm, greater than 5.0 V/nm, greater than 10 V/nm. In another embodiment of the disclosed multilayered structure, a surface of the dielectric layer contains surfactant which is intended to increase wettability of the electro-conductive material in the time of forming the multilayered electrode. In yet another embodiment of the present disclosure, the multilayered structure has a rectangular shape in-plan. In still another embodiment of the multilayered structure, the dielectric layer comprises a material selected from oxides, nitrides, oxynitrides and fluorides. In another embodiment of the multilayered structure, the dielectric layer comprises a material selected from $SiO_2$, $SiO_xN_y$, $HfO_2$, $Al_2O_3$ or $Si_3N_4$. In one embodiment of the multilayered structure, the dielectric layer comprises an organic compound which is characterized by electronic polarizability and has a following general structural formula (1):

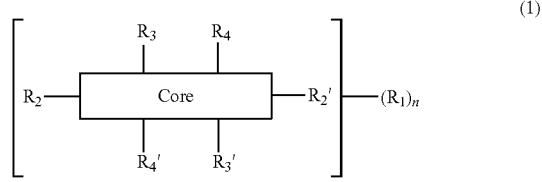

(1)

where Core is an aromatic polycyclic conjugated molecule, $R_1$ is a group that electrically insulates the organic compound from neighboring compounds and in some instances may also provide solubility of the organic compound in an organic solvent, n is between 1 and 8, $R_2$ and $R_2'$ are substituents located in apex positions, $R_3$ and $R_3'$ and $R_4$ and $R_4'$ are substituents located on side (lateral) positions. The core has flat anisometric form and the $R_2$ substituent is independently selected from hydrogen and electrophilic groups (acceptors) and nucleophilic groups, and the $R_2'$ substituent is independently selected from hydrogen and nucleophilic groups (donors) and electrophilic groups (acceptors). Substituents $R_3$ and $R_3'$ and $R_4$ and $R_4'$ are independently selected from hydrogen and nucleophilic groups (donors) and electrophilic groups (acceptors). The substitutes $R_2$, $R_2'$, $R_3$, $R_3'$, $R_4$, $R_4'$ cannot be hydrogen simultaneously.

In yet another embodiment of the multilayered structure, the dielectric layer comprises an electro-polarizable complex compound having the following general formula (2):

where complexing agent M is a four-valence metal, ligand L comprises at least one heteroatomic fragment comprising at least one metal-coordinating heteroatom (neutral or anionic) and at least one electrically resistive fragment that provides resistivity to electric current, m represents the number of ligands, x represents the oxidative state of the metal-ligand complex, K is a counter-ion or zwitterionic polymer which provides an electro-neutrality of the complex compound, n represents the number of counter-ions, wherein said metal-coordinating heteroatoms form a first coordination sphere, and the number of heteroatoms in this first coordination sphere does not exceed 12.

In still another embodiment of the multilayered structure, the dielectric layer comprises an electro-polarizable compound having the following general formula (3):

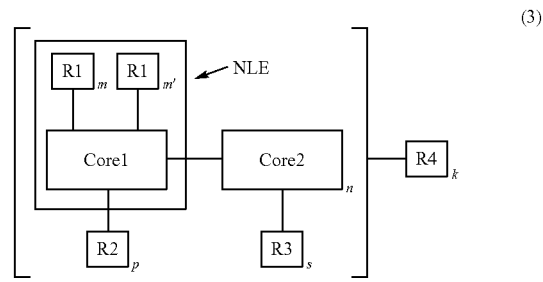

(3)

where Core1 is an aromatic polycyclic conjugated molecule having two-dimensional flat form and self-assembling by pi-pi stacking in a column-like supramolecule, R1 are electron donor groups connected to the aromatic polycyclic conjugated molecule (Core1) and R1' are electron acceptor groups connected to the aromatic polycyclic conjugated molecule (Core1), m is number of acceptor groups R1 , m' is a number of donor groups R1', m and m' are equal to 0, 1, 2, 3, 4, 5 or 6, wherein m and m' are not both equal to 0, R2 is a substituent comprising one or more ionic groups from a class of ionic compounds that are used in ionic liquids connected to the aromatic polycyclic conjugated molecule (Core1) directly or via a connecting group, p is a number of ionic groups R2 which is equal to 0, 1, 2, 3 or 4. The fragment marked NLE containing the Core1 with at least one group R1 and/or R1' has a nonlinear effect of polarization. The Core2 is an electro-conductive oligomer, n is a number of the electro-conductive oligomers which is equal to 0, 2, or 4, R3 is a substituent comprising one or more ionic groups from a class of ionic compounds that are used in ionic liquids connected to the electro-conductive oligomer (Core2) directly or via a connecting group, s is a number of the ionic groups R3 which is equal to 0, 1, 2, 3 or 4. The substituent R4 is a resistive substituent providing solubility of the organic compound in a solvent and electrically insulating the column-like supramolecules from each other and connected to the aromatic polycyclic conjugated molecule (Core1) and/or to the electro-conductive oligomer (Core2) directly or via a connecting group, k is a number of substituents R4 which is equal to 0, 1, 2, 3, 4, 5, 6, 7 or 8.

The present disclosure provides the film energy storage device as disclosed above. In one embodiment of the disclosed film energy storage device, the two laminated multilayered structures are wound into a spiral.

In order that aspects of the present disclosure may be more readily understood, reference is made to the following Figures, which are intended to be illustrative of the invention, but is not intended to be limiting in scope.

In one non-limiting example of an embodiment of the disclosed multilayered electrode schematically shown in FIG. 1, the following sequence of layers is carried out: an electro-conductive layer 1, field-planarization layer 2, tunneling injection blocking layer 3, and a coulomb blocking layer 4. The multilayered electrode may include one, two or three protective layers which are different and may be selected from the list consisting of the field-planarization layer, tunneling injection blocking layer and the coulomb blocking layer. These protective layers may be sandwiched together in any sequence.

Figure 2:
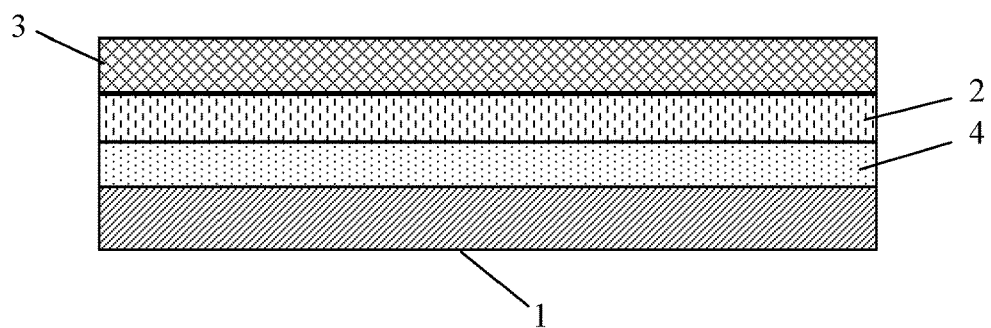
FIG. 2 schematically shows another non-limiting example of a multilayered electrode with a different sequence of protective layers than the multilayered electrode shown in FIG. 1 in accordance with aspects of the present disclosure.

FIG. 2 depicts another non-limiting example of an embodiment of the disclosed multilayered electrode is schematically. This multilayered electrode is characterized by a different sequence of the above-mentioned protective layers. In this example, the coulomb blocking layer 4 is created on an electro-conductive layer 1. The field-planarization layer 2 is formed upon the coulomb blocking layer 4 and the tunneling injection blocking layer 3 is formed on the field planarization layer.

Figure 3:
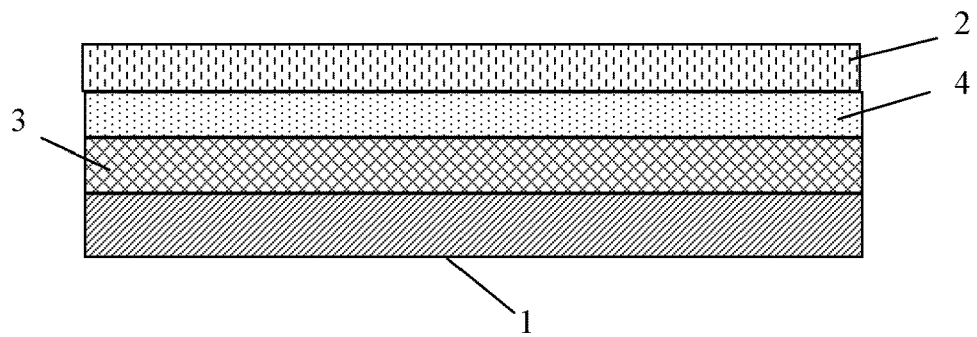
FIG. 3 schematically shows still another non-limiting example of a multilayered electrode with a different sequence of protective layers than the electrodes shown in FIG. 1 and FIG. 2 in accordance with aspects of the present disclosure.

FIG. 3 schematically shows still another non-limiting example of the disclosed multilayered electrode which is characterized by yet another sequence of protective layers in comparison with the electrodes shown in FIG. 1 and FIG. 2. Specifically, the tunneling injection blocking layer 3 is formed upon the electro-conductive layer 1, the coulomb blocking layer 4 is formed upon the tunneling injection blocking layer 3, and the field planarization layer 2 is formed upon the coulomb blocking layer 4.

Figure 4:
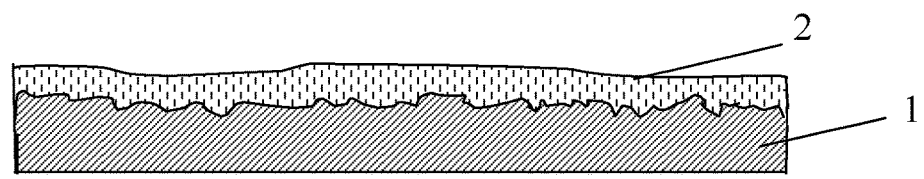
FIG. 4 schematically illustrates the function of a field-planarization layer in a multilayered electrode in accordance with aspects of the present disclosure when this layer smooths roughness features (e.g., ledges and cavities) of the surface of the electro-conductive layer.

FIG. 4 schematically illustrates an example of the field-planarization layer 2 smoothing roughness (e.g., ledges and cavities) of the surface of the electro-conductive layer 1.

Figure 5:
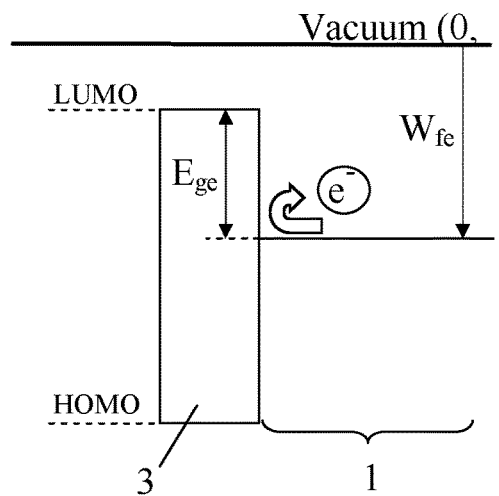
FIG. 5 depicts an energy band diagram in contact with the tunneling injection blocking layer and the electro-conductive layer of a multilayered electrode in accordance with aspects of the present disclosure.

FIG. 5 shows an energy band diagram for the tunneling injection blocking layer 3 and the electro-conductive layer 1, FIG. 5, LUMO denotes an energy level of a lowest unoccupied molecular orbital of the tunneling injection blocking layer 3 and HOMO denotes a highest occupied molecular orbital of the tunneling injection blocking layer 3. $W_{fe}$ denotes the work function of the electro-conductive layer 1 and the energy gap $E_{ge}$ is equal to LUMO—$W_{fe}$. FIG. 5 also shows how the electrons are reflected from the energy gap $E_{ge}$ leading to a decrease of leakage current and injection of electrons out of the electro-conductive layer 1.

Figure 6:
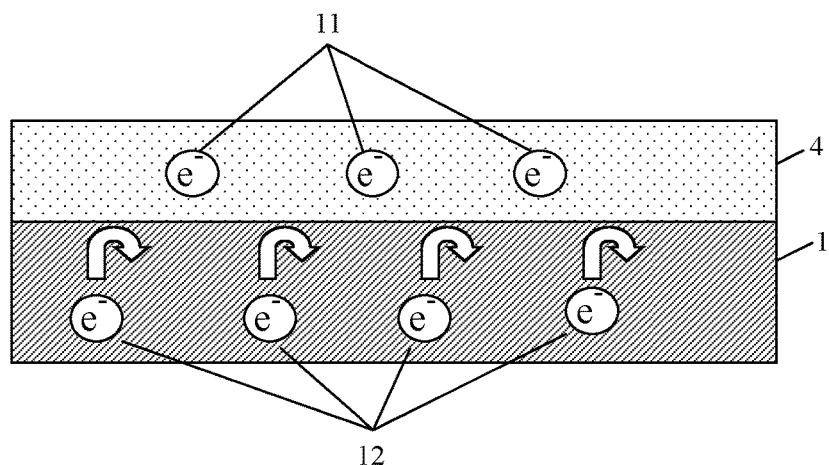
FIG. 6 schematically shows mechanism of functioning of the coulomb blocking layer of a multilayered electrode in accordance with aspects of the present disclosure.

FIG. 6 schematically illustrates functioning of the coulomb blocking layer 4. When first electrons are injected into this layer out of the electro-conductive layer 1, they become motionless (are fixed) on these traps and the coulomb blocking layer 4 becomes negatively charged at the expense of the electrons which are stored in this layer. This stored electric charge 11 will prevent injection of new electrons 12 into this layer due to Coulomb repulsion of the injected electrons and the stored electric charge. Thus, "the coulomb blocking layer" carries out blockade of an injection of electrons into this coulomb blocking layer.

Figure 7:
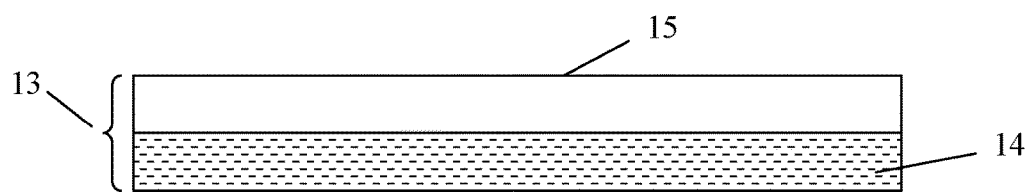
FIG. 7 schematically shows a non-limiting example of a multilayered structure which comprises a dielectric layer and multilayered electrode located on one surface of the dielectric layer in accordance with aspects of the present disclosure.

FIG. 7 schematically shows a multilayered structure 13 having a dielectric layer 14 and multilayered electrode 15 located on one surface of the dielectric layer. The multilayered electrode 15 includes an electro-conductive layer, a field-planarization layer, a tunneling injection blocking layer and a coulomb blocking layer, as described above. In the multilayered electrode 15, the three protective layers, i.e., the field-planarization layer, tunneling injection blocking layer and coulomb blocking layer may be sandwiched together in any sequence including, but not limited to the sequences depicted in FIG. 1, FIG. 2, and FIG. 3.

Figure 8:
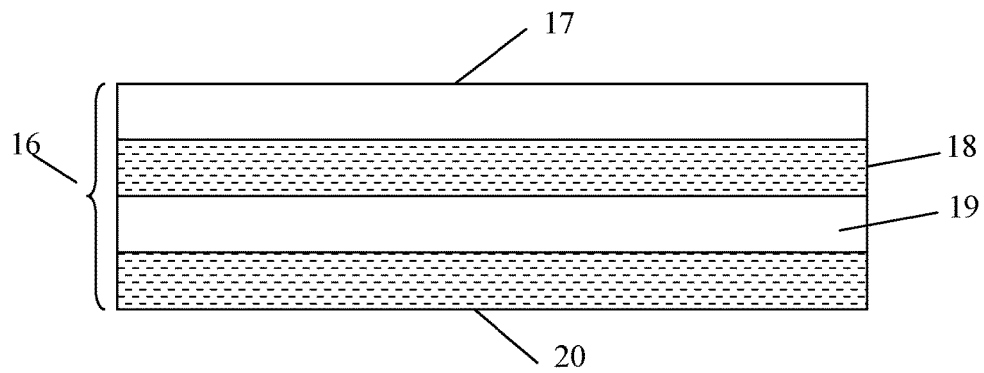
FIG. 8 schematically shows a non-limiting example of a laminated structure in accordance with aspects of the present disclosure characterized by the following sequence of layers: multilayered electrode—dielectric layer—multilayered electrode—dielectric layer.

FIG. 8 schematically shows a laminated structure 16 which characterized by the following sequence of layers: first multilayered electrode 17—first dielectric layer 18—second multilayered electrode 19—second dielectric layer 20. By way of example, and not by way of limitation, the thickness of each multilayered electrode 17, 19 may be in the range from about 30 nm up to about 300 nm and the thickness of each dielectric layer 18, 20 may be in the range from about 1000 nm up to about 5000 nm and for some applications up to 10,000 nm. By way of example, and not by way of limitation, the dielectric layers 18 and 20 may include one or more of the types of electro-polarizable compounds described above with respect to formula (1), formula (2), or formula (3).

Figure 9:
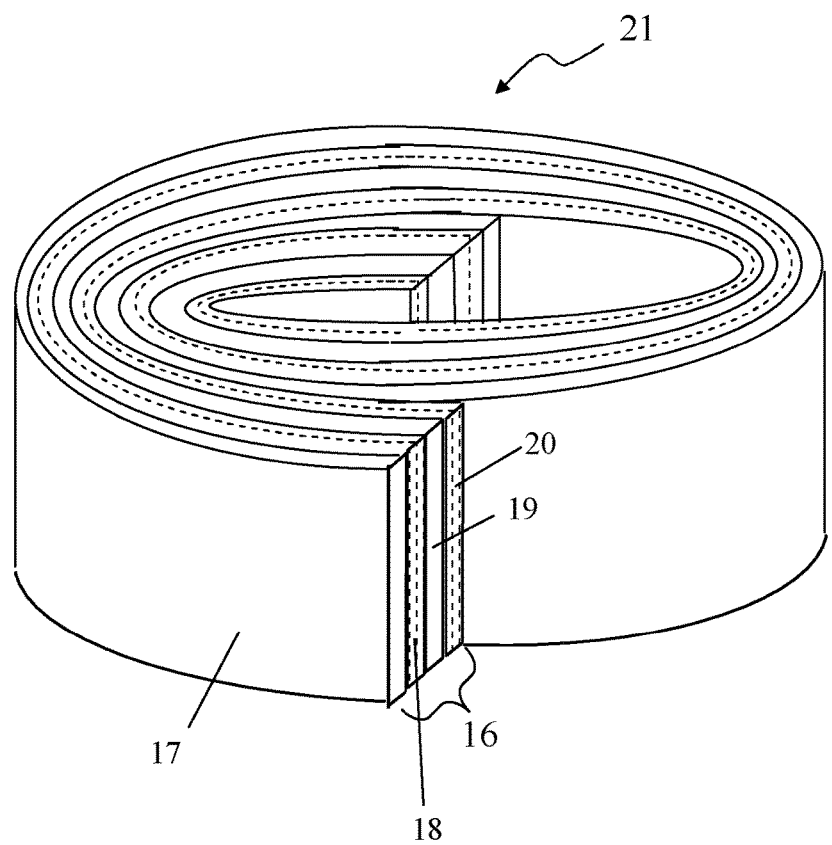
FIG. 9 schematically shows one non-limiting example of a disclosed film energy storage device in accordance with aspects of the present disclosure.

FIG. 9 schematically shows a film energy storage device 21 wherein a laminated multilayered structure 16 of the type described above and shown in FIG. 8 is wound (coiled) into a spiral. In some implementations, two or more such laminated multilayered structures may be sandwiched together and then wound (coiled) into a spiral. The length of the layered structures wound into one device/coil may be, e.g., from 300 m up to 10,000 m and even higher for some applications. Further, in some implementations two or more laminated multilayered structures sandwiched together and wound into a coiled capacitor may include from about 500 turns to more than 45,000 turns.

While the above includes a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. An multilayered electrode comprising an electro-conductive layer and at least one protective layer located on one side of the electro-conductive layer and selected from the list comprising a field-planarization layer configured to minimize electric field enhancement due to geometric curvature on a surface of the electro-conductive layer, a tunneling injection blocking layer including a wide-band gap organic insulating material, a coulomb blocking layer including electron traps, and any combination of two or more of these.

2. The multilayered electrode according to claim 1, comprising one, two or three protective layers which are different and selected from the list consisting of the field-planarization layer, tunneling injection blocking layer and the coulomb blocking layer sandwiched together in any sequence.

3. The multilayered electrode according to claim 1, wherein a material of the electro-conductive layer is selected from the list consisting of metal, an electro-conductive oligomer, an electro-conductive (current-conducting) polymer, a molecular-crystal material, a molecular material.

4. The multilayered electrode according to claim 3, wherein the electro-conductive (current-conducting) polymer is selected from the list consisting of polyacetylene, polypyrrole, polythiophene, polyaniline, poly-p-phenylene-sulphide, poly-para-phenylenevinylene, polyindole, polycarbazole, polyazulene, polyfluorene, polynaphthalene.

5. The multilayered electrode according to claim 3, wherein a material of the electro-conductive layer is selected from the list consisting of nickel, gold, platinum, lead, chromium, titanium, copper, aluminium, molybdenum, tungsten, indium, silver, calcium, tantalum, palladium and any combination thereof.

6. The multilayered electrode according to claim 3, wherein the material of the electro-conductive layer comprises an electro-conductive oligomer including a phenylene oligomer and a polyacene quinine radical oligomer.

7. The multilayered electrode according to claim 6, wherein the electro-conductive oligomer is selected from the structures 1 to 9 wherein n=2, 3, 4, 5, 6, 7, 8, 9, 10, 11 or 12, Z is =O, =S or =NT$_1$, and T$_1$ is selected from the group consisting of unsubstituted or substituted C$_1$-C$_{18}$alkyl, unsubstituted or substituted C$_2$-C$_{18}$alkenyl, unsubstituted or substituted C$_2$-C$_{18}$alkynyl, and unsubstituted or substituted C$_4$-C$_{18}$aryl

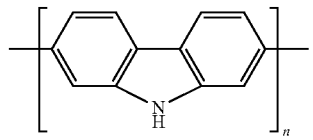

1

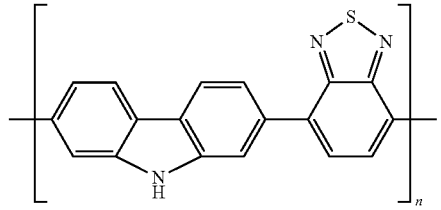

2

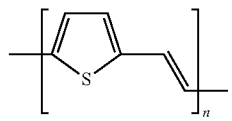

3

-continued

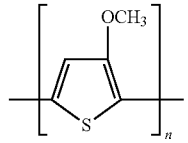

4

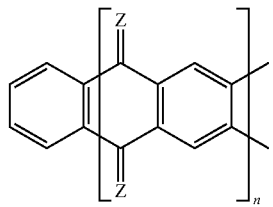

5

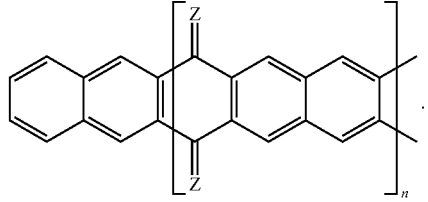

6

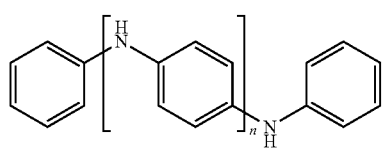

7

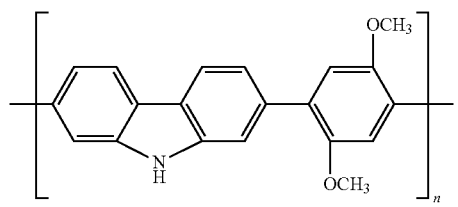

8

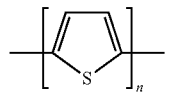

9

8. The multilayered electrode according to claim 1, wherein protective layer includes the field-planarization layer, wherein the field planarization layer includes a polarizable material deposited from liquid or melt stage (phase), where polarizability of the polarizable material is greater than polarizability of propylene.

9. The multilayered electrode according to claim 1, wherein the protective layer includes the field-planarization layer, wherein the field planarization layer includes an electro-conductive material deposited from liquid or melt stage (phase).

10. The multilayered electrode according to claim 1, wherein the protective layer includes the coulomb blocking layer, wherein the coulomb blocking layer includes tetrapyrrolic macrocyclic fragments having a general structural formula from the group comprising structures 10-14, where M is an atom of metal serving as the electron traps:

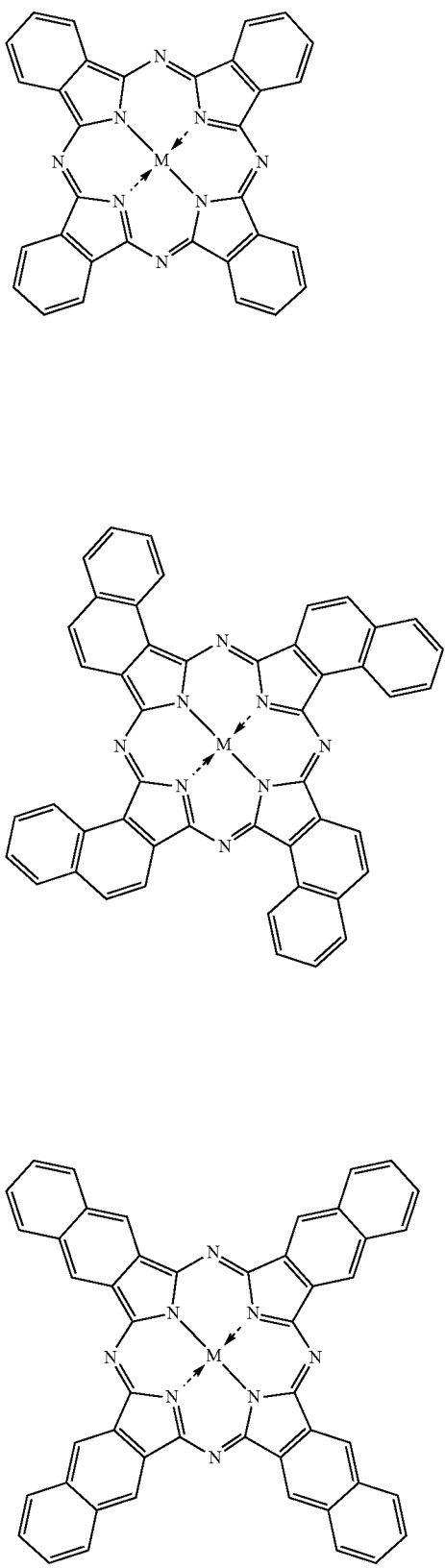

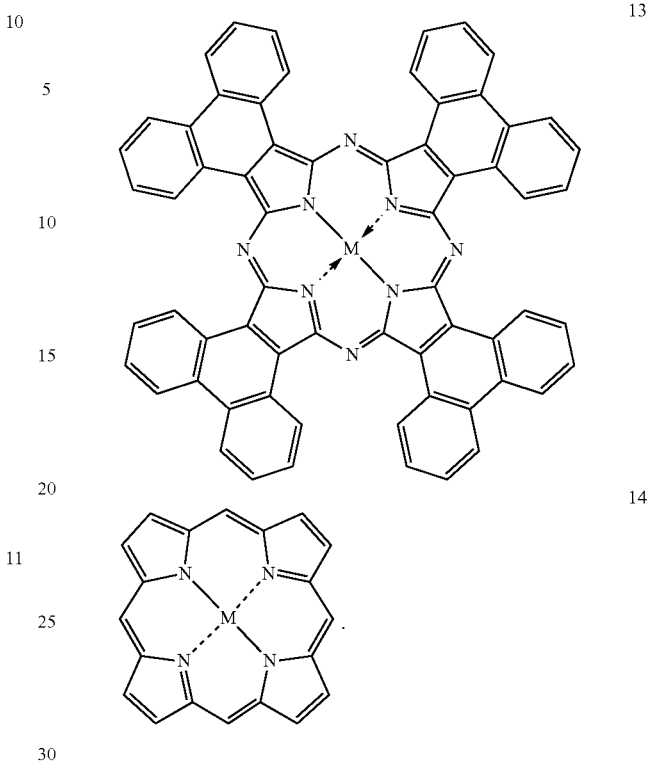

11. The multilayered electrode according to claim 1, wherein the protective layer includes the tunneling injection blocking layer including a wide-band gap organic insulating material, wherein the wide-band gap organic insulating material has an energy gap band greater than 4 electron-volts, wherein the energy gap band is an energy difference between an energy level of a lowest unoccupied molecular orbital (LUMO) of the tunneling injection blocking layer and a highest occupied molecular orbital (HOMO) of the tunneling injection blocking layer.

12. The multilayered electrode according to claim 1, wherein the protective layer includes the tunneling injection blocking layer including a wide-band gap organic insulating material, wherein a difference between a lowest unoccupied molecular orbital (LUMO) energy level of the wide-band gap organic insulating material and a work function (Wf) of the electro-conductive layer is not less than 1 electron-volt.

13. The multilayered electrode according to claim 1, wherein the protective layer includes the tunneling injection blocking layer including a wide-band gap organic insulating material, wherein a difference between a work function (Wf) of the electro-conductive layer and a highest occupied molecular orbital (HOMO) energy level of the wide-band gap organic insulating material is not less than 1 electron-volt.

14. The multilayered electrode according to claim 1, wherein the protective layer includes the tunneling injection blocking layer, wherein the tunneling injection blocking layer is monomolecular layer and comprises amphiphilic molecules selected from the list consisting of amines ($RNH_3^+$), carboxylates ($RCO_2^-$), sulphates ($RSO_4^-$), sulfonates ($RSO_3^-$), phosphates ($RHPO_4^-$), alcohols (ROH), thiols (RSH), where R is a carbon chain comprising more than ten $CH_2$- and $CF_2$-groups.

15. The multilayered electrode according to claim 14, wherein the carbon chains are polymerized by ultraviolet light.

16. The multilayered electrode according to claim 14, wherein a thickness of the tunneling injection blocking layer is not less, than 1nm and is defined by the carbon chain length.

17. A multilayered structure for an energy storage device comprising
a dielectric layer, and
the multilayered electrode according to claim 1, located on one surface of the dielectric layer.

18. The multilayered structure according to claim 17, wherein the dielectric layer comprises a material having breakdown field strength greater than 0.5 V/nm, greater than 1.0 V/nm, greater than 5.0 V/nm, greater than 10 V/nm.

19. The multilayered semi-product according to claim 17, wherein a surface of the dielectric layer contains surfactant which is intended to increase wettability of the electro-conductive material in the time of forming the multilayered electrode.

20. The multilayered structure according to claim 17, having a rectangular shape in-plan.

21. The multilayered structure according to claim 17, wherein the dielectric layer comprises a material selected from oxides, nitrides, oxynitrides and fluorides.

22. The multilayered structure according to claim 21, wherein the dielectric layer comprises a material selected from $SiO_2$, $SiO_xN_y$, $HfO_2$, $Al_2O_3$ or $Si_3N_4$.

23. The multilayered structure according to claim 17, wherein the dielectric layer comprises an organic compound which is characterized by electronic polarizability and has a following general structural formula:

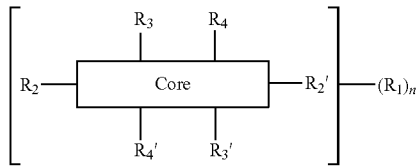

where Core is an aromatic polycyclic conjugated molecule,
$R_1$ is a group that electrically insulates said organic compound from neighboring compounds, n is between 1 and 8,
$R_2$ and $R_2'$ are substituents located in apex positions,
$R_3$, $R_3'$, $R_4$, and $R_4'$ are substituents located on side (lateral) positions and,
wherein the core has flat anisometric form and the $R_2$ substituent is independently selected from hydrogen and electrophilic groups (acceptors) and nucleophilic groups, and the $R_2'$ substituent is independently selected from hydrogen and nucleophilic groups (donors) and electrophilic groups (acceptors); and
$R_3$, $R_3'$, $R_4$, and $R_4'$ substituents are independently selected from hydrogen and nucleophilic groups (donors) and electrophilic groups (acceptors), and
wherein the substitutes $R_2$, $R_2'$, $R_3$, $R_3'$, $R_4$, and $R_4'$ cannot be hydrogen simultaneously.

24. The multilayered structure according to claim 23, wherein $R_1$ is a group that electrically insulates said organic compound from neighboring compounds and provides solubility of the organic compound in an organic solvent.

25. The multilayered structure according to claim 17, wherein the dielectric layer comprises an electro-polarizable complex compound having the following general formula:

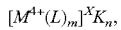

where complexing agent M is a four-valence metal, ligand L comprises at least one heteroatomic fragment comprising at least one metal-coordinating heteroatom (neutral or anionic) and at least one electrically resistive fragment that provides resistivity to electric current, m represents the number of ligands, x represents the oxidative state of the metal-ligand complex, K is a counter-ion or zwitterionic polymer which provides an electro-neutrality of the complex compound, n represents the number of counter-ions, wherein said metal-coordinating heteroatoms form a first coordination sphere, and the number of heteroatoms in this first coordination sphere does not exceed 12.

26. The multilayered structure according to claim 17, wherein the dielectric layer comprises an electro-polarizable compound having the following general formula:

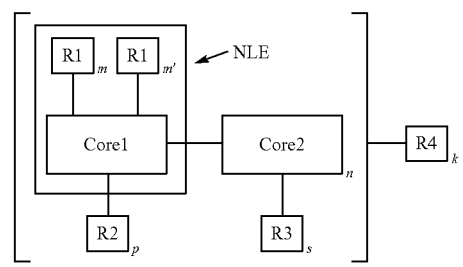

where Core1 is an aromatic polycyclic conjugated molecule having two-dimensional flat form and self-assembling by pi-pi stacking in a column-like supramolecule, R1 are electron donor groups connected to the aromatic polycyclic conjugated molecule (Core1) and R1' are electron acceptor groups connected to the aromatic polycyclic conjugated molecule (Core1), m is number of acceptor groups R1, m' is a number of donor groups R', m and m' are equal to 0, 1, 2, 3, 4, 5 or 6, wherein m and m' are not both equal to 0, R2 is a substituent comprising one or more ionic groups from a class of ionic compounds that are used in ionic liquids connected to the aromatic polycyclic conjugated molecule (Core1) directly or via a connecting group, p is a number of ionic groups R2 which is equal to 0, 1, 2, 3 or 4;
wherein the fragment marked NLE containing the Core1 with at least one group R1 and/or R1' has a nonlinear effect of polarization,
wherein Core2 is an electro-conductive oligomer, n is a number of the electro-conductive oligomers which is equal to 0, 2, or 4, R3 is a substituent comprising one or more ionic groups from a class of ionic compounds that are used in ionic liquids connected to the electro-conductive oligomer (Core2) directly or via a connecting group, s is a number of the ionic groups R3 which is equal to 0, 1, 2, 3 or 4;
wherein R4 is a resistive substituent providing solubility of the organic compound in a solvent and electrically insulating the column-like supramolecules from each other and connected to the aromatic polycyclic conjugated molecule (Core1) and/or to the electro-conductive oligomer (Core2) directly or via a connecting group, k is a number of substituents R4 which is equal to 0, 1, 2, 3, 4, 5, 6, 7 or 8.

27. A film energy storage device comprising two multilayered structures according to claim 17 laminated with each other, wherein the laminated structure is characterized by the following sequence of layers: multilayered electrode—dielectric layer—multilayered electrode—dielectric layer.

28. The film energy storage device according to claim 27, wherein the two laminated multilayered structures are wound (coiled) into a spiral.

29. The film energy storage device according to claim 27, wherein the dielectric layer comprises a material having breakdown field strength greater than 0.5 V/nm, greater than 1.0 V/nm, greater than 5.0 V/nm, greater than 10 V/nm.

30. The film energy storage device according to claim 27, wherein a surface of the dielectric layer contains surfactant which is intended to increase wettability of the electro-conductive material in the time of forming the multilayered electrode.

31. The film energy storage device according to claim 27, having a rectangular shape in-plan.

32. The film energy storage device according to claim 27, wherein the dielectric layer comprises a material selected from oxides, nitrides, oxynitrides and fluorides.

33. The film energy storage device according to claim 32, wherein the dielectric layer comprises a material selected from $SiO_2$, $SiO_xN_y$, $HfO_2$, $Al_2O_3$ or $Si_3N_4$.

34. The film energy storage device according to claim 27, wherein the dielectric layer comprises an organic compound which is characterized by electronic polarizability and has a following general structural formula:

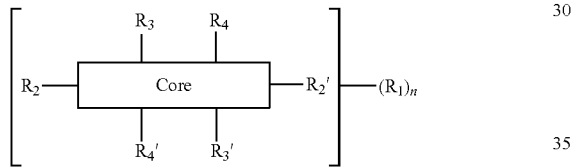

where Core is an aromatic polycyclic conjugated molecule,
$R_1$ is a group that electrically insulates the organic compound from neighboring compounds,
n is between 1 and 8,
$R_2$ and $R_2'$ are substituents located in apex positions,
$R_3$, $R_3'$, $R_4$, and $R_4'$ are substituents located on side (lateral) positions and,
wherein the core has flat anisometric form and the $R_2$ substituent is independently selected from hydrogen and electrophilic groups (acceptors) and nucleophilic groups, and the $R_2'$ substituent is independently selected from hydrogen and nucleophilic groups (donors) and electrophilic groups (acceptors); and
$R_3$, $R_3'$, $R_4$, and $R_4'$ substituents are independently selected from hydrogen and nucleophilic groups (donors) and electrophilic groups (acceptors), and wherein the substitutes $R_2$, $R_2'$, $R_3$, $R_3'$, $R_4$, and $R_4'$ cannot be hydrogen simultaneously.

35. The film energy storage device according to claim 34, wherein $R_1$ is a group that electrically insulates said organic compound from neighboring compounds and provides solubility of the organic compound in an organic solvent.

36. The film energy storage device according to claim 27, wherein the dielectric layer comprises an electro-polarizable complex compound having the following general formula:

$$[M^{4+}(L)_m]^x K_n,$$

where complexing agent M is a four-valence metal, ligand L comprises at least one heteroatomic fragment comprising at least one metal-coordinating heteroatom (neutral or anionic) and at least one electrically resistive fragment that provides resistivity to electric current, m represents the number of ligands, x represents the oxidative state of the metal-ligand complex, K is a counter-ion or zwitterionic polymer which provides an electro-neutrality of the complex compound, n represents the number of counter-ions, wherein said metal-coordinating heteroatoms form a first coordination sphere, and the number of heteroatoms in this first coordination sphere does not exceed 12.

37. The film energy storage device according to claim 27, wherein the dielectric layer comprises an electro-polarizable compound having the following general formula:

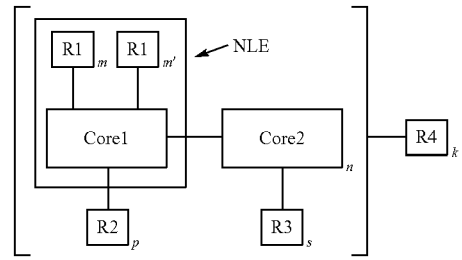

where Core1 is an aromatic polycyclic conjugated molecule having two-dimensional flat form and self-assembling by pi-pi stacking in a column-like supramolecule, R1 are electron donor groups connected to the aromatic polycyclic conjugated molecule (Core1) and R1' are electron acceptor groups connected to the aromatic polycyclic conjugated molecule (Core1), m is number of acceptor groups R1, m' is a number of donor groups R', m and m' are equal to 0, 1, 2, 3, 4, 5 or 6, wherein m and m' are not both equal to 0, R2 is a substituent comprising one or more ionic groups from a class of ionic compounds that are used in ionic liquids connected to the aromatic polycyclic conjugated molecule (Core1) directly or via a connecting group, p is a number of ionic groups R2 which is equal to 0, 1, 2, 3 or 4;
wherein the fragment marked NLE containing the Core1 with at least one group R1 and/or R1' has a nonlinear effect of polarization,
wherein Core2 is an electro-conductive oligomer, n is a number of the electro-conductive oligomers which is equal to 0, 2, or 4, R3 is a substituent comprising one or more ionic groups from a class of ionic compounds that are used in ionic liquids connected to the electro-conductive oligomer (Core2) directly or via a connecting group, s is a number of the ionic groups R3 which is equal to 0, 1, 2, 3 or 4; wherein R4 is a resistive substituent providing solubility of the organic compound in a solvent and electrically insulating the column-like supramolecules from each other and connected to the aromatic polycyclic conjugated molecule (Core1) and/or to the electro-conductive oligomer (Core2) directly or via a connecting group, k is a number of substituents R4 which is equal to 0, 1, 2, 3, 4, 5, 6, 7 or 8.

* * * * *